United States Patent
Stevenson

(10) Patent No.: US 7,922,067 B2
(45) Date of Patent: Apr. 12, 2011

(54) TAILOR WELDED BLANK ASSEMBLY AND METHOD

(75) Inventor: Robin Stevenson, Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 685 days.

(21) Appl. No.: 11/871,356

(22) Filed: Oct. 12, 2007

(65) Prior Publication Data

US 2008/0086857 A1    Apr. 17, 2008

Related U.S. Application Data

(60) Provisional application No. 60/829,740, filed on Oct. 17, 2006.

(51) Int. Cl.
*B23K 28/02* (2006.01)
*B23K 33/00* (2006.01)

(52) U.S. Cl. ............ 228/171; 29/521; 29/897.2; 83/29; 83/32; 428/582

(58) Field of Classification Search .................. None
See application file for complete search history.

(56) References Cited

U.S. PATENT DOCUMENTS

| | | | | |
|---|---|---|---|---|
| 1,446,274 | A * | 2/1923 | Roberts | 428/589 |
| 1,806,508 | A * | 5/1931 | Smith | 114/79 W |
| 3,301,992 | A * | 1/1967 | Seeloff | 219/105 |
| 4,873,415 | A * | 10/1989 | Johnson et al. | 219/121.64 |
| 6,048,628 | A * | 4/2000 | Hillmann et al. | 428/594 |
| 6,214,478 | B1 * | 4/2001 | Soell et al. | 428/582 |
| 6,261,701 | B1 * | 7/2001 | Fields, Jr. | 428/577 |
| 6,426,153 | B1 * | 7/2002 | Duley et al. | 428/577 |
| 6,866,942 | B1 * | 3/2005 | Hashimoto et al. | 428/577 |
| 6,977,355 | B2 * | 12/2005 | Duley et al. | 219/121.64 |
| 2005/0013954 | A1 * | 1/2005 | Kaegi et al. | 428/36.9 |

FOREIGN PATENT DOCUMENTS

DE          4307563 A1    9/1993

* cited by examiner

*Primary Examiner* — John J Zimmerman

(57) ABSTRACT

A tailor weld blank assembly and method for making the blank assembly include providing a first metal sheet and a second metal sheet having at least one different characteristic from the first sheet. Complementary interlocking structures are provided on adjoining edges of the first and second sheets and the sheets are mechanically interlocked together by making a weld along the adjoining interlocked edges. Thereafter the permanently affixed together sheets are formed to make a formed sheet metal product. The provision of both a mechanical interlock and a weld provide a blank assembly that is strong for forming into a stamped product, and a metal product that is strong for its intended use.

6 Claims, 4 Drawing Sheets

TAILOR WELDED BLANK ASSEMBLY AND METHOD

CROSS REFERENCE TO RELATED APPLICATION

This application claims priority of U.S. Provisional Application Ser. No. 60/829,740, filed on Oct. 17, 2006.

FIELD OF THE INVENTION

The present invention relates to the fabrication of a tailor welded sheet metal blank assembly made by welding together two metal sheets having at least one different characteristic, and more particularly provides for the provision of interlocking structures between the two metal sheets.

BACKGROUND OF THE INVENTION

It is well known in the manufacturing industries, such as the auto industry, to form a sheet metal panel in a stamping process where the sheet metal panel is pressed between a pair of dies to assume a complex three-dimensional shape. A sheet metal blank is typically cut from a coil of material. The sheet metal material is chosen for its desirable characteristics, such as thickness of the metal, alloy of the metal, surface coating on the sheet metal, etc.

It is also known in the manufacturing industries to create a tailor welded blank by welding together two separate sheet metal blanks having different characteristics. For example, in the manufacture of a door inner panel, it may be desirable to have a first portion of the door inner panel constructed of a galvanized sheet metal of a certain gauge to provide requisite corrosion resistance and high strength. Another portion of the door inner panel may be made of a lighter gauge of metal with no galvanized coating.

Accordingly, tailor welded blanks have been manufactured by first creating two separate blanks of the sheet metal materials having the different characteristics, and then butting the edges of the two sheets together and welding the adjoining edges of the sheets to create a permanent attachment. In this way, a blank assembly is created that is comprised of the two different sheet materials having different characteristics. This blank assembly, known as a tailor welded blank, is then processed through the conventional stamping or other metal forming processes. Thus, the finished product, such as a door inner panel, will have different portions of the finished product having different sheet metal characteristics.

Because the portions of the blank assembly have sheet metal of different characteristics, the different regions of the blank assembly may react differently during the forming process and may perform differently in the finished product after forming as a finished product. For example, adjoining regions, once subjected to a welding process such as laser welding, may exhibit different microstructures and as a consequence may exhibit different mechanical properties from one another. Thus in the forming process the different portions of the part will behave differently under the deformation that occurs during the forming process, and there may be a non-uniform strain distribution in the finished part.

SUMMARY OF THE INVENTION

According to the invention, a tailor welded blank is made by providing first and second metal sheets having at least one different characteristic from each other. Complementary interlocking structures, such as fingers, are formed on adjoining edges of the first and second sheets. The sheets are interlocked together by engaging the interlocking structure of the first and second sheets. The sheets are then permanently affixed together by welding of the interlocked edges of the sheets. Thereafter, the tailor welded blank assembly can be stamped or otherwise formed to manufacture a sheet metal article.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF THE PREFERRED EMBODIMENT

The following description of certain exemplary embodiments is exemplary in nature and is not intended to limit the invention, its application, or uses.

Figure 1:
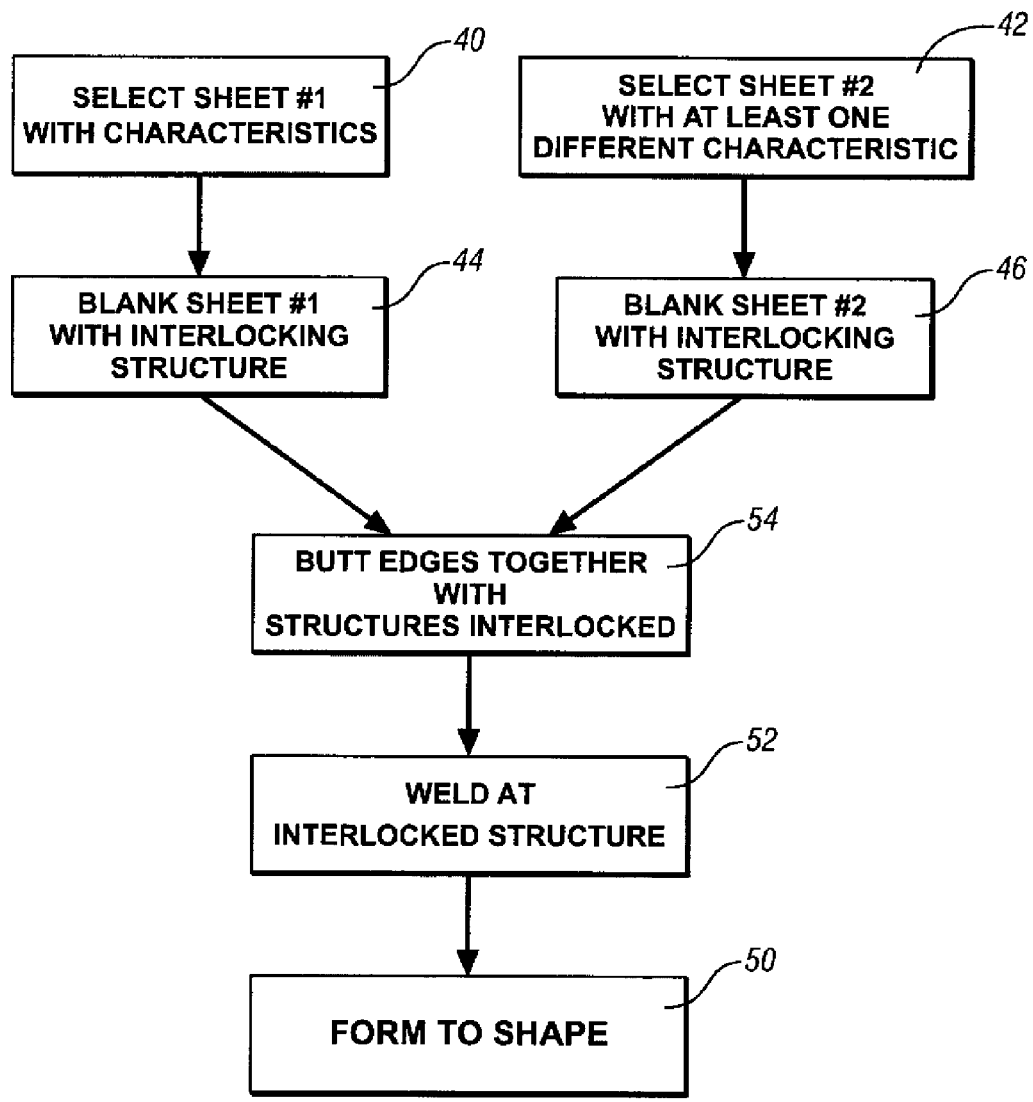
FIG. 1 is a flow chart showing the steps in the present method.
Figure 2:
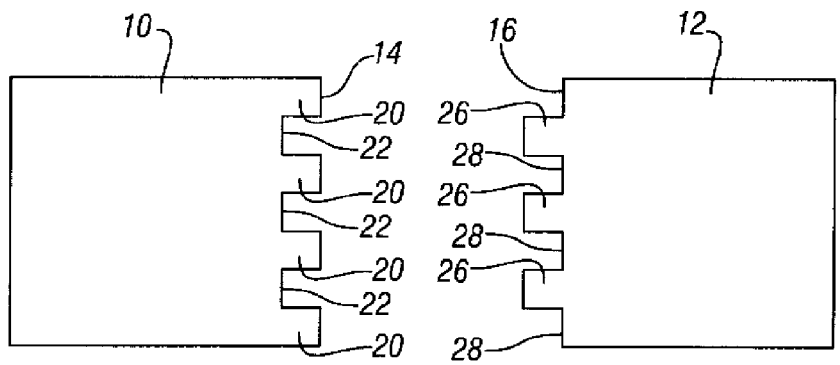
FIG. 2 is a plan view showing two metal sheets having interlocking structures formed on adjoining edges.

Referring to FIGS. 1 and 2, a first metal sheet or blank 10 and a second metal sheet or blank 12 are provided. These metal sheets 10 and 12 are preferably blanks that have been severed from a larger sheet or coil of material. The metal sheets 10 and 12 have at least one different characteristic. For example, the sheet 10 can be a steel material of a certain gauge, and sheet 12 may have a galvanized metal coating and be of a thicker gauge than the sheet 10. As seen in FIG. 2, the sheet 10 has an edge 14 that faces toward an edge 16 of sheet 12. Edge 14 of the sheet 10 has been sheared, using known metal shearing processes such as blanking and fine blanking to provide a geometrically featured saw tooth edge comprised of alternating fingers 20 and grooves 22. Likewise, edge 16 of sheet 12 has been sheared to provide alternating fingers 26 and grooves 28. As seen in FIG. 2, the fingers and grooves of the sheets 10 and 12 are rectangular in shape and staggered so that a finger 20 of the sheet 10 will fit into a groove 28 of the sheet 12. However, the fingers can also be oval, round, square or triangular in shape.

Figure 3:
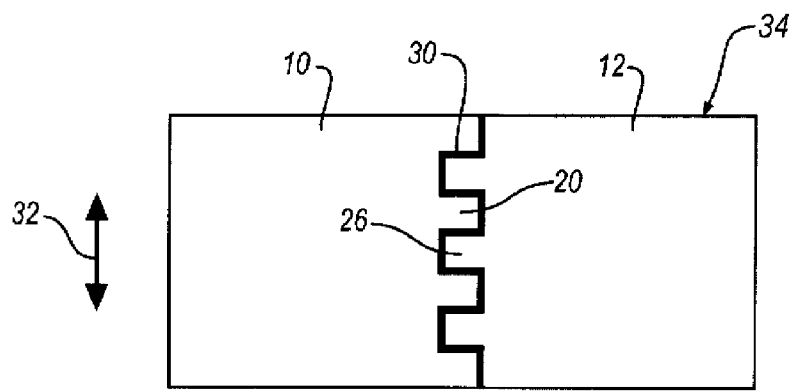
FIG. 3 shows the two sheets of FIG. 2 engaged together and welded together.

Thus, as seen in FIG. 3, the sheets 10 and 12 can be interengaged by interlocking the fingers of one sheet within the complementary grooves of the other sheet. After the sheets 10 and 12 have been pushed together, as shown in FIG. 3, a continuous weld 30 is made along the abutting surfaces of the interlocked fingers and grooves, for example by welding, particularly laser welding. Accordingly, as seen in FIG. 3, it will be understood that the effective length of the weld between the sheets 10 and 12 would be perhaps twice the length of the weld that would normally be obtained by merely welding together adjacent straight line edges of sheets 10 and 12. In addition, as seen in FIG. 3, it will be understood that the interlocking of the fingers and grooves between the sheets 10 and 12 will create a mechanical interference or interlock between the sheets 10 and 12 that will supplement the weld 30 insofar as resisting relative movement between the sheets 10 and 12 within the plane of the sheets in the direction of arrows 32.

Thus, the welding together of the adjoining and interlocked edges of the sheets 10 and 12 of different metal characteristic creates a tailor welded sheet or blank assembly 34 that may then be subsequently processed through a conventional stamping or other metal forming process. Referring to FIG. 1, it is seen that the method for manufacturing the tailor welded blank assembly 34 includes, at step 40, selecting a first sheet to provide certain characteristics, and at step 42, selecting a second sheet having at least one characteristic that is different from the first sheet. At steps 44 and 46, the selected sheets are each blanked to form interlocking structures along an edge thereof. At step 50, the two different sheets are butted together at their adjoining edges with the interlocking structures interlocked. At step 52, the weld is formed at the adjoining interlocked edges to form the tailor welded blank assembly 34. At step 54, the tailor welded blank assembly 34 is formed to shape using a stamping process or other known metal.

Figure 4:
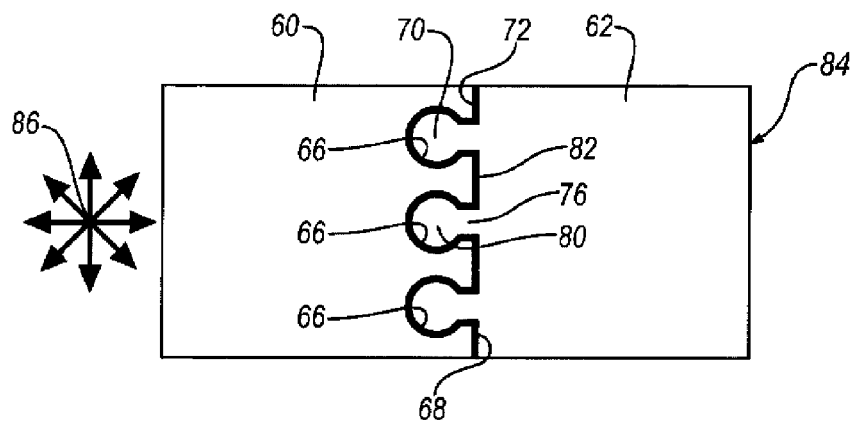
FIG. 4 shows another embodiment of the invention in which the interlocking structures have a shape different from that of the embodiment of FIGS. 2 and 3.

FIG. 4 shows another embodiment of the invention. In FIG. 4, a first sheet 60 and a second sheet 62 of different characteristic from sheet 60 have been selected and their edges have been sheared to create interlocking structures which include keyhole shaped slots 66 provided on edge 68 of the sheet 60 and complementary keyhole shaped structures 70 on the edge 72 of the sheet 62. Each of the keyhole shaped structures 70 includes a narrow stem 76 and a round head 80. As seen in FIG. 4, the sheets 60 and 62 are butted together with the keyhole shaped structures 70 of the sheet 62 located within the keyhole slots 66 of the sheet 60. Thereafter, the two sheets 60 and 62 are welded together, for example, by traversing a laser welder all along the interlocked adjoining edges of the two sheets 60 and 62 to make a tailor welded blank assembly 84. Accordingly, as seen in FIG. 4, the weld 82 between the two plates will extend at a length which is substantially greater than the weld length that would have been obtained by merely welding together straight line adjoining edges of the two sheets 60 and 62. In addition, it will be understood that the keyhole shape of the interlock between the sheets 60 and 62 has created a mechanical interference between the sheets 60 and 62 which will be effective to resist relative movement between the sheets 60 and 62 omni-directionally, that is in the direction of arrows 86, within the plane of the sheets 60 and 62.

Figure 5:
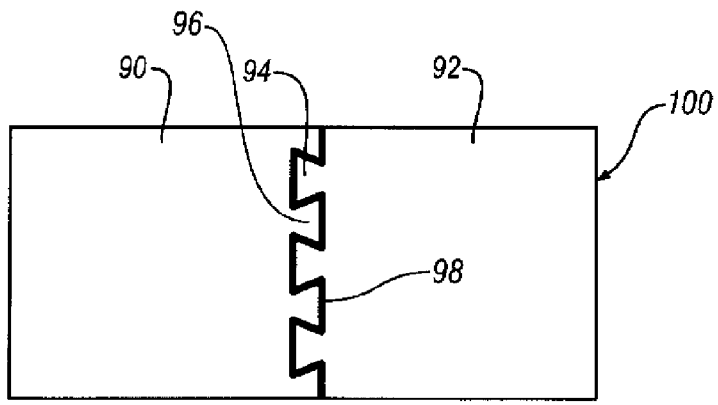
FIG. 5 shows yet another embodiment of the interlocking structures.

FIG. 5 shows yet another example of the invention where the sheets 90 and 92 of different material characteristic are interlocked together by dovetail shaped interlocking structures at 94 and 96 and joined by a weld 98. It will be understood that FIGS. 3, 4 and 5 show only three possible shapes of interlocking structures that can be provided between the two metal sheets and that other shapes will readily suggest themselves to a person of skill in the art. In addition, it will be observed that the number, size, and shape of the interlocking structures can be varied as desired to obtain the desired degree of mechanical interlock between the two separate sheets that are welded together to form a tailor welded blank assembly 100.

Figure 6:
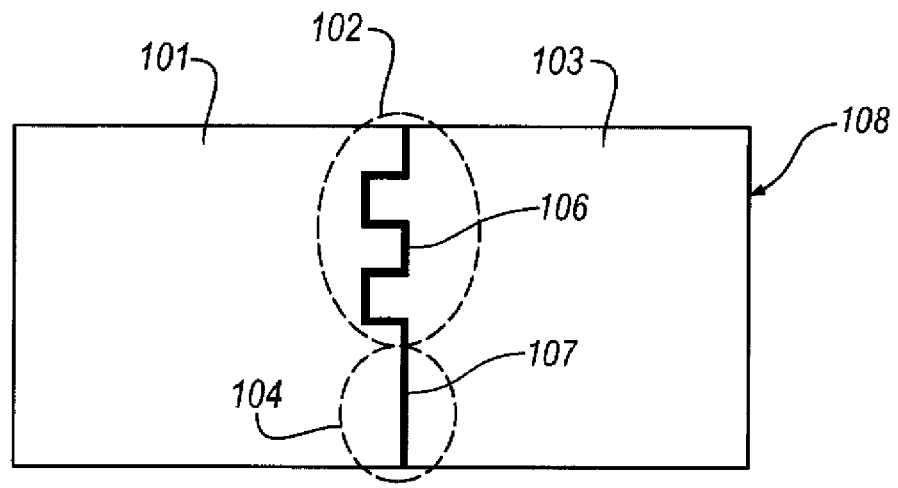
FIG. 6 is another embodiment of the invention in which the interlocking structures are provided along only a portion of the adjoining faces of the two metal sheets

FIG. 6 shows yet another example of the invention in which a first sheet 101 and a second sheet 103 are provided with interlocking structures along their adjoining edges, but only in the region designated 102, while a remaining region 104 of the adjoining edges between the sheets 101 and 103 has merely a straight line adjoining edges that is free of the interlocking structures. Accordingly, it is appreciated that in the example of FIG. 6, the interlocking structures are provided only at the first region 102 and joined by weld 106, while at the region 104, a straight line weld 107 can be employed to join the sheets 101 and 103, thus making a tailor welded blank assembly 108. Thus, the example of FIG. 6 recognizes that in some product designs, it may be necessary or desirable to provide for the mechanical interlocking structures between the sheets in a region that will be subjected to greater stress during stamping or use, while it is sufficient to have a simpler straight line abutment and welded attachment between the sheets in a different region where the stamping or use of the formed product will be subjected to a lower level of stress.

Figure 7:
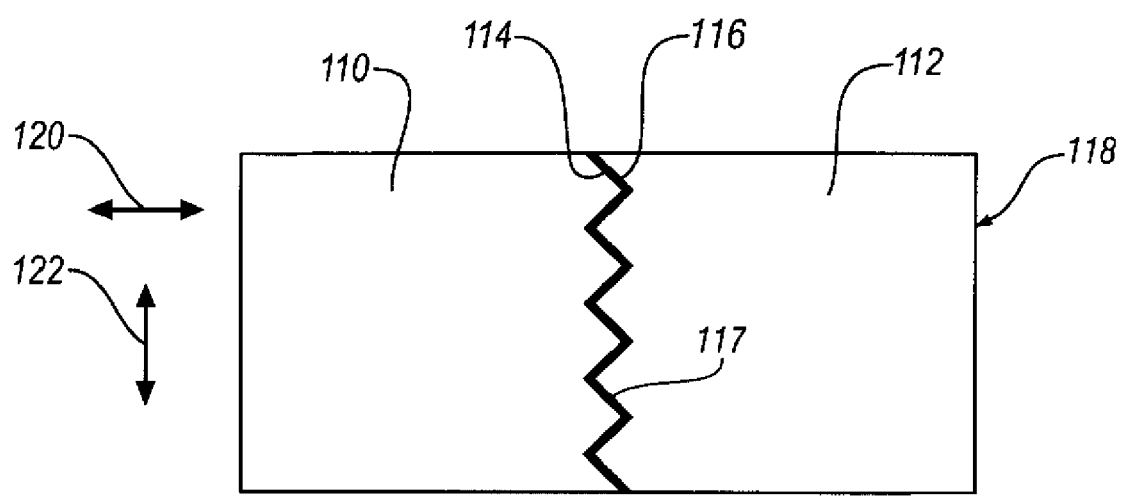
FIG. 7 shows another embodiment of the interlocking structures.

Referring to FIG. 7, sheets 110 and 112 each have complimentary triangular shaped saw tooth edges 114 and 116 forming the interlocking structures. After welding together of the interlocking structures by a weld 117, the resulting blank assembly 118 will be formed and then subjected to use as a finished product in which the maximum direction of stress and loading will be in either the longitudinal direction of arrows 120 or the lateral direction of arrows 122. Because of the saw tooth shape of the interlock, no part of the weld line between the two sheets 110 and 112 extends in a direction that coincides with or is perpendicular to the direction of maximum stress. In other words, the weld line is at an acute angle with respect to the direction of maximum stress.

Figure 8:
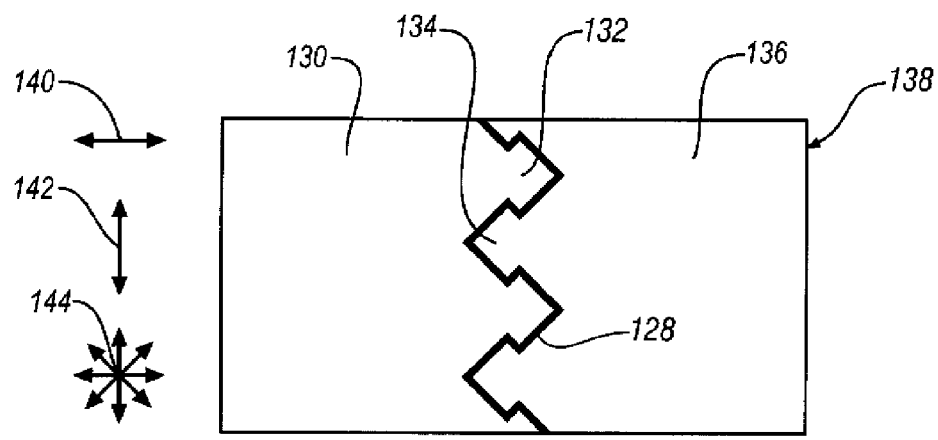
FIG. 8 shows another embodiment of the interlocking structures.

FIG. 8 shows another example of an interlocking structure where each segment of the weld line 128 is oriented at an acute angle with respect to the direction of maximum stress. In particular, sheet 130 has diamond shaped prongs 132 that interlock with diamond shaped prongs 134 of sheet 136. Thus, whether the direction of maximum stress in forming or in use is in the direction of arrows 140 or arrows 142, all segments of the weld line between the two sheets 130 and 136 of tailor welded blank assembly 138 will be at an angle with respect to the direction maximum force. Furthermore, whether the direction of maximum stress in forming or in use is in the direction of arrows 140 or arrows 142, the diamond shape provides an omni-directional mechanical interlock, within the plane of the sheets, in the direction of arrows 144 between the sheets 130 and 136 in addition to the welded connection therebetween.

Figure 9:
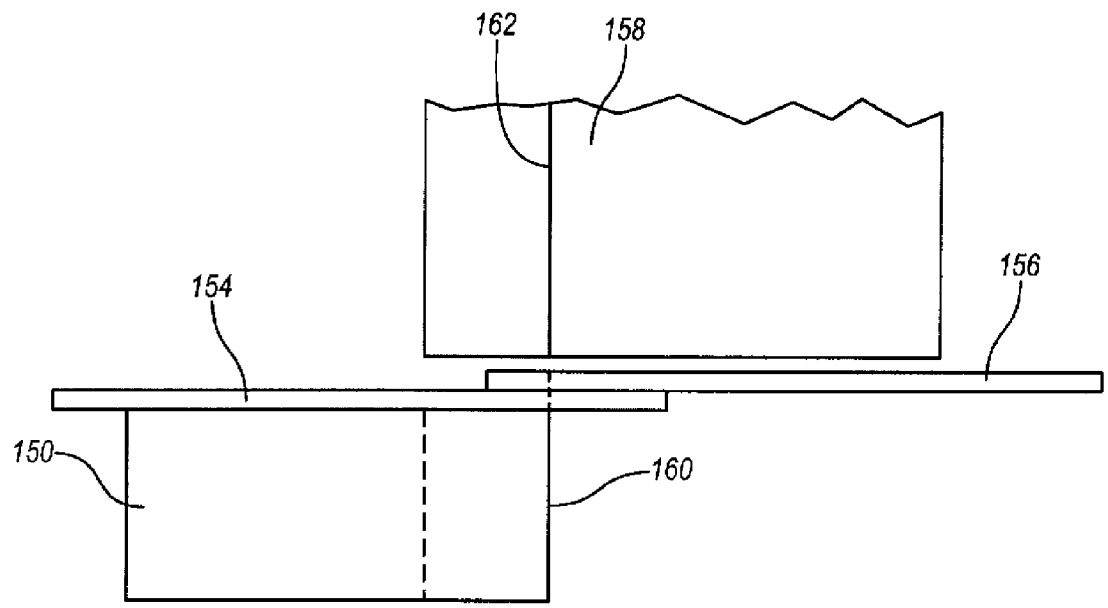
FIG. 9 shows a die for simultaneously forming the interlocking structures on the two metal sheets.

Referring to FIG. 9, apparatus is shown for simultaneously forming the interlocking structure on separate metal sheets 154 and 156. In particular, a lower die 150 supports the first metal sheet 154. The edge of the second metal sheet 156 is placed atop the sheet 154 so as to overlap a portion of the sheet 154. An upper die 158 is lowered to shear the sheets 154 and 156 between the upper die 158 and the lower die 150. The lower die 150 has an end face 160 and the upper die 158 has an end face 162 that are configured figured to provide the interlocking shapes of FIGS. 3, 4, 5, 6, 7, or 8 between the sheets 154 and 156. Thus, it will be understood that the die apparatus of FIG. 3 will simultaneously perform the blanking steps of 44 and 46 of FIG. 1 in a single shear die operation.

Thus it is seen that the invention provides a new and improved tailor welded blank assembly and a method for its manufacture.

The foregoing description of the invention is merely exemplary in nature and, thus, variations thereof are intended to be within the scope of the invention. The term welding as used herein is intended to encompass the various types of joining processes that may be employed in the manufacture of tailor welded blanks. Although laser welding is most typically used, the term welding as used means any known sheet joining process such as roller mash welding, electron beam welding, adhesive welding, brazing, and soldering that can be used to make tailor welded blank assemblies. In the event that the welding process will use a filler material, it will be appreciated that a slight gap may be provided between the interlocking structures in order to receive the filler material. And if the tolerances resulting from the shearing process result in the occurrence of a slight gap between the interlocking structures, a filler material may be used advantageously in the welding process to fill the gap.

What is claimed is:

1. Method of making a formed article from two pieces of sheet metal comprising the steps of:
   providing a first sheet;
   providing a second sheet having at least one different characteristic from the first sheet;
   laying an edge of the second sheet atop an edge of the first sheet and simultaneously shearing the sheets between a pair of dies, said dies having die end faces formed to create complementary interlocking structures on adjoining edges of the first and second sheets;
   interlocking the sheets together by engaging the interlocking structure of the first and second sheets together;
   permanently welding the first and second sheets together in a continuous welded seam along the interlocked edges; and
   after the welding, forming the permanently affixed first and second sheets to make the formed article.

2. The method of claim 1 further comprising the welding being performed by a laser welder.

3. The method of claim 1 further comprising said interlocking structures being a saw tooth configuration formed on the abutting edges of the sheets and having a square or triangular or oval or round shape.

4. The method of claim 1 further comprising said interlocking structures being a dovetail or key shaped or diamond shaped prong configuration formed on the abutting edges of the sheets so that the sheets are mechanically interlocked against any movement relative one another in any direction within the plane of the sheets.

5. The method of claim 1 further comprising said interlocking structures being provided continuously all along the adjoining edges of the sheets.

6. The method of claim 1 further comprising providing the interlocking structures along only a portion of the adjoining edges of the sheets so that a first region of the sheets is interlocked and welded and a second region is not interlocked but is welded.

* * * * *